(12) United States Patent
Uchikawa et al.

(10) Patent No.: US 8,377,838 B2
(45) Date of Patent: Feb. 19, 2013

(54) METHOD FOR PRODUCTION OF DDR TYPE ZEOLITE MEMBRANE

(75) Inventors: Tetsuya Uchikawa, Nagoya (JP); Kenji Yajima, Nagoya (JP); Hisayoshi Nonaka, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 467 days.

(21) Appl. No.: 12/630,169

(22) Filed: Dec. 3, 2009

(65) Prior Publication Data

US 2010/0144512 A1 Jun. 10, 2010

(30) Foreign Application Priority Data

Dec. 10, 2008 (JP) .................................. 2008-314100
Nov. 9, 2009 (JP) .................................. 2009-255809

(51) Int. Cl.
*B01J 29/06* (2006.01)
*B01J 20/28* (2006.01)

(52) U.S. Cl. .................. 502/4; 502/60; 502/63; 502/64; 502/70

(58) Field of Classification Search ................ 502/4, 60, 502/63, 64, 70
See application file for complete search history.

(56) References Cited

U.S. PATENT DOCUMENTS

| | | | |
|---|---|---|---|
| 6,953,493 | B2 | 10/2005 | Nakayama et al. |
| 2004/0173094 | A1 | 9/2004 | Nakayama et al. |
| 2005/0229779 | A1 | 10/2005 | Nakayama et al. |
| 2008/0047432 | A1 | 2/2008 | Nonaka et al. |
| 2009/0011926 | A1 | 1/2009 | Yajima et al. |
| 2009/0108239 | A1* | 4/2009 | Caro et al. ............... 252/373 |

FOREIGN PATENT DOCUMENTS

| | | |
|---|---|---|
| EP | 1 437 172 A1 | 7/2004 |
| EP | 1 894 613 A1 | 3/2008 |
| EP | 1 995 215 A1 | 11/2008 |
| JP | 2004-066188 A1 | 3/2004 |
| JP | 2004-083375 A1 | 3/2004 |

OTHER PUBLICATIONS

Tomita et al., "Gas separation characteristics of DDR type zeolite membrane", Microporous and Mesoporous Materials 68 (2004), 71-75.*

Jelan Kuhn et al., *Detemplation of DDR type zeolites by ozonication*, Microporous and Mesoporous Materials, vol. 120, Sep. 26, 2008, pp. 12-18.

W.M. Meier, et al., "*Atlas of Zeolite Structure Types*," Elsevier (1996).

* cited by examiner

Primary Examiner — Elizabeth Wood
(74) Attorney, Agent, or Firm — Burr & Brown

(57) ABSTRACT

A method is provided for producing a DDR type zeolite membrane, including a membrane formation step of immersing a porous substrate having a DDR type zeolite seed crystal adhered thereon, in a raw material solution containing 1-adamantaneamine, silica ($SiO_2$) and water, and conducting a hydrothermal synthesis of DDR type zeolite to form a 1-adamantaneamine-containing DDR type zeolite membrane on the porous substrate to produce a precursor of DDR type zeolite membrane-containing body, and a burning step of heating the precursor at 400° C. or above and at 550° C. or below to burn and remove the 1-adamantaneamine contained in the DDR type zeolite membrane.

3 Claims, 4 Drawing Sheets

METHOD FOR PRODUCTION OF DDR TYPE ZEOLITE MEMBRANE

FIELD OF THE INVENTION

The present invention relates to a DDR type zeolite membrane capable of functioning as a molecular sieve membrane to low-molecular weight gases such as carbon dioxide ($CO_2$), methane ($CH_4$), ethane ($C_2H_6$) and the like.

BACKGROUND OF THE INVENTION

Zeolite is in use as catalyst, catalyst carrier, adsorbent material, etc. Also, a zeolite membrane is comprised of a porous substrate made of a metal or a ceramic and a zeolite membrane formed thereon, and has come to be used as a gas separation membrane or a pervaporation membrane, by utilizing the molecular sieve function of zeolite.

Zeolites are classified such as LTA, MFI, MOR, AFI, FER, FAU, DDR and the like according to their crystal structures. Of these, DDR (Deca-Dodecasil 3R) is a crystal whose main component is silica and has pores formed by a polyhedron containing an oxygen eight-membered ring. The pore diameter of the oxygen eight-membered ring is 4.4×3.6 angstroms [see W. M. Meier, D. H. Olson, Ch. Baerlocher, Atlas of zeolite structure types, Elsevier (1996)].

Of various zeolites, DDR type zeolite has relatively small pores and can be used as a molecular sieve membrane to low-molecular weight gases such as carbon dioxide ($CO_2$), methane ($CH_4$), ethane ($C_2H_6$) and the like.

With respect to the method for production of DDR type zeolite, there is disclosed, for example, a method for producing a DDR type zeolite, which comprises immersing a DDR type zeolite seed crystal in a raw material solution containing 1-adamantaneamine, silica, water and ethylenediamine and conducting a hydrothermal synthesis to give rise to crystal growth in a short time. In this method, it is also possible to produce a dense DDR type zeolite membrane on a porous substrate (see Patent Literatures 1 and 2).

In conventional known production methods including the methods described in the Patent Literatures 1 and 2, the DDR type zeolite membrane after formation by hydrothermal synthesis has a form in which the 1-adamataneamine used as a structure-directing agent is taken into the pores of DDR zeolite. Therefore, in these methods for producing a DDR type zeolite membrane, there is required a step of heating the DDR type zeolite membrane, just after formation by hydrothermal synthesis, in order to burn and remove the 1-adamantaneamine.

Patent Literature 1: JP-A-2004-66188
Patent Literature 2: JP-A-2004-83375

However, when the DDR type zeolite membrane is heated in order to burn and remove the 1-adamantaneamine, cracks are generated easily in the DDR zeolite membrane at a high frequency, due to the difference in thermal expansion between the porous substrate and the DDR zeolite membrane formed thereon. There is a means of burning and removing the 1-adamantaneamine at a lower heating temperature. However, with a lower heating temperature, the 1-adamantaneamine remains in the DDR type zeolite membrane. The generation of cracks in DDR type zeolite membrane and the remaining of 1-adamantanamine in DDR type zeolite membrane invite a reduction in separation ability of DDR type zeolite membrane to low-molecular weight gas, etc. However, in conventional known methods for producing a DDR type zeolite membrane, the above-mentioned problems of crack generation and 1-adamantaneamine remaining, which invite a reduction in separation ability of DDR type zeolite membrane, are undissolved yet.

SUMMARY OF THE INVENTION

In view of the above problems, the task of the present invention is to provide a method for producing a DDR type zeolite membrane which is low in crack generation in DDR type zeolite membrane and also low in remaining of 1-adamantaneamine in DDR type zeolite membrane.

In order to achieve the above task, the present inventors made a study. As a result, the present inventors found the appropriate heating conditions of DDR type zeolite membrane for burning and removing 1-adamantaneamine. The finding has led to the completion of the present invention. According to the present invention, there is provided a method for producing a DDR type zeolite membrane, which is shown below.

According to a first aspect of the present invention, a method for producing a DDR type zeolite membrane having a separation ability of 10 or higher separation coefficient to a mixed gas of carbon dioxide ($CO_2$) and methane ($CH_4$), is provided, comprising a membrane formation step of immersing a porous substrate having a DDR type zeolite seed crystal adhered thereon, in a raw material solution containing 1-adamantaneamine, silica ($SiO_2$) and water, and conducting a hydrothermal synthesis of DDR type zeolite to form a 1-adamantaneamine-containing DDR type zeolite membrane on the porous substrate to produce a precursor of DDR type zeolite membrane, and a burning step of heating the precursor at 400° C. or above and at 550° C. or below to burn and remove the 1-adamantaneamine contained in the DDR type zeolite membrane.

According to a second aspect of the present invention, a method for producing a DDR type zeolite membrane according to the first aspect is provided, wherein, in the burning step, the precursor is heated at 400° C. or above and below 450° C. for 100 hours or longer.

According to a third aspect of the resent invention, a method for producing a DDR type zeolite membrane according to the first aspect is provided, wherein, in the burning step, the precursor is heated at 450° C. or above and at 550° C. or below for 50 hours or longer to obtain a DDR type zeolite membrane having a separation ability of 10 or higher separation coefficient to a mixed gas of carbon dioxide ($CO_2$) and methane ($CH_4$) and $200 \times 10^{-9}$ mol/sec·m²·Pa or higher permeance of carbon dioxide ($CO_2$).

In the method for producing a DDR type zeolite membrane, of the present invention, there can be produced a DDR type zeolite membrane which is low in crack generation in DDR type zeolite membrane and also low in remaining of 1-adamantaneamine in DDR type zeolite membrane.

DETAILED DESCRIPTION OF THE INVENTION

Figure 1:
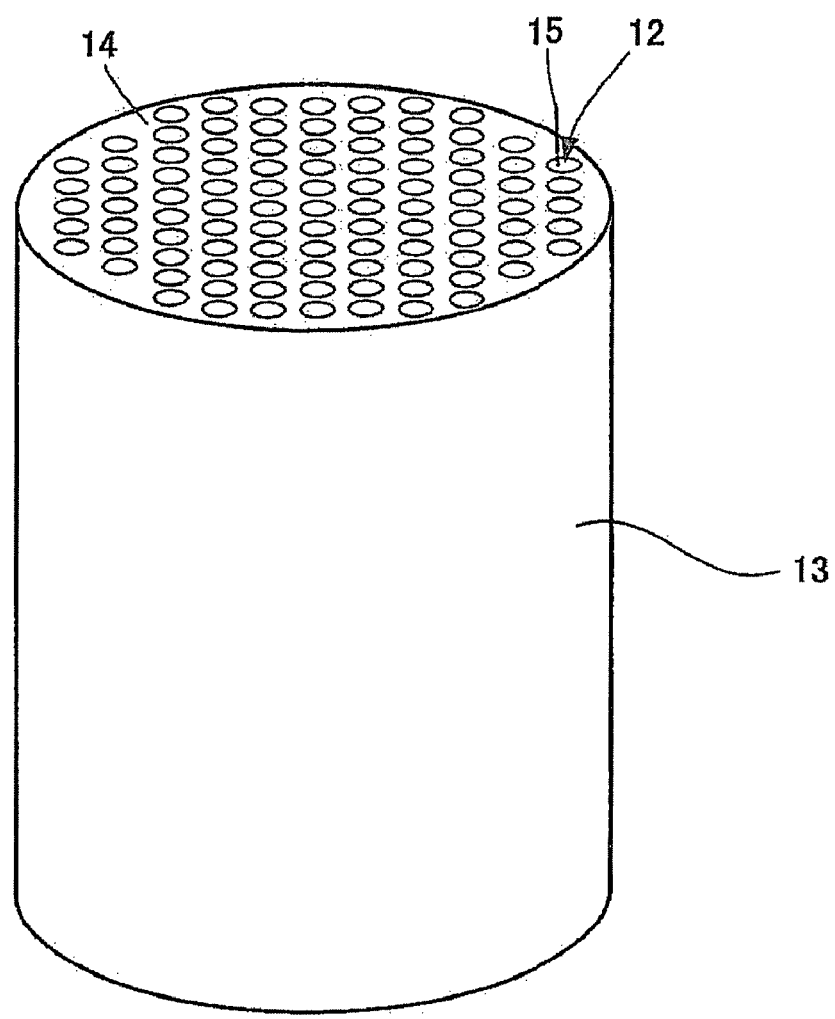
FIG. 1 is a perspective view schematically showing a porous substrate used in an embodiment of the method of the present invention for production of DDR type zeolite membrane.

An embodiment of the present invention is explained below with reference to the accompanying drawings. The present invention is in no way restricted to the following embodiment, and changes, modifications, and improvements may be added thereto as long as there is no deviation from the scope of the present invention.

1. Method for Production of DDR Type Zeolite Membrane:
1-1. Outline of the Present Method for Production of DDR Type Zeolite Membrane:

The method for production of DDR type zeolite membrane, of the present invention (hereinafter, the method is referred to as "the present production method") comprises a membrane formation step of forming a DDR type zeolite membrane on a porous substrate using 1-adamantaneamine as a structure-directing agent, and a burning step of burning and removing the 1-adamantaneamine contained in the DDR type zeolite membrane.

The membrane formation step of the present production method is a step of forming a 1-adamantaneamine-containing DDR type zeolite membrane on the porous substrate by hydrothermal synthesis. Hydrothermal synthesis is conducted by immersing a porous substrate having a DDR type zeolite seed crystal adhered thereon, in a raw material solution containing 1-adamantaneamine, silica ($SiO_2$) and water.

The burning step of the present production method is a step of heating the precursor of a DDR type zeolite membrane at 400° C. or above and at 550° C. or below to burn and remove the 1-adamantaneamine contained in the DDR type zeolite membrane.

A DDR type zeolite membrane produced by the present production method is low in crack generation in DDR type zeolite membrane and also low in remaining of 1-adamantaneamine in DDR type zeolite membrane. Thereby, in the present production method, there can be produced, at a high yield, a DDR type zeolite membrane having a separation ability of 10 or higher separation coefficient to a mixed gas of carbon dioxide ($CO_2$) and methane ($CH_4$).

Explanation is made in detail below on "the membrane formation step" and "the burning step".

1-2. Steps of the Present Method for Production of DDR Type Zeolite Membrane:
1-2-1. Membrane Formation Step:

In the membrane formation step of the present production method, there is prepared a raw material solution containing 1-adamantaneamine, silica ($SiO_2$) and water. In this raw material solution is immersed a porous substrate having a DDR type zeolite seed crystal adhered thereon, and a hydrothermal synthesis is conducted, whereby can be formed a 1-adamantaneamine-containing DDR type zeolite membrane, on the porous substrate.

1-2-1-1. Raw Material Solution:

Silica ($SiO_2$) contained in a raw material solution is a supply source of the silicon (Si) and oxygen (O) constituting the DDR type zeolite membrane. The 1-adamantaneamine is a structure-directing agent for formation of DDR type zeolite membrane in the process of formation of DDR type zeolite membrane from Si and other components.

In preparing the raw material solution used in the present production method, the silica used is preferably a silica sol. In preparing the raw material solution, the ratio of 1-adamantaneamine to silica [1-adamantaneamine/silica (molar ratio)] is preferably 0.002 to 0.5, more preferably 0.002 to 0.2. When the ratio is smaller than 0.002, the 1-adamantanamine (a structure-directing agent) is short, which may make difficult the formation of DDR type zeolite. When the ratio is larger than 0.5, the formation of membrane-shaped DDR type zeolite is difficult and the use amount of expensive 1-adamantaneamine is large, which invite an increase in production cost.

Further, in preparing the raw material solution, the ratio of water to silica [water/silica (molar ratio)] is preferably 10 to 500, more preferably 10 to 200. When the ratio is smaller than 10, the silica concentration is too high and the formation of DDR type zeolite may be difficult and, even if the DDR type zeolite has been formed, it may not be formed in a membrane shape. When the ratio is larger than 500, the silica concentration is too low and the formation of DDR type zeolite may be difficult.

Ethylenediamine is preferably contained in the raw material solution. By preparing a raw material solution containing ethylenediamine, the dissolution of 1-adamantaneamine is easy and a dense DDR type zeolite membrane having a uniform crystal size and a uniform membrane thickness can be produced.

The ratio of ethylenediamine to 1-adamantaneamine [ethylenediamine/1-adamantaneamine (molar ratio)] is preferably 4 to 35, more preferably 8 to 32. When the ratio is smaller then 4, the amount of ethylenediamine for easily dissolving 1-adamantaneamine is insufficient. When the ratio is larger than 35, the amount of ethylenediamine not contributing to the reaction is excessive, which invites a high production cost.

In preparing the raw material solution, it is preferred to dissolve 1-adamantaneamine in ethylenediamine beforehand to prepare a 1-adamantaneamine solution. Also it is preferred to prepare a raw material solution by mixing 1-adamantaneamine solution with a silica sol solution containing silica. The thus-prepared raw material solution can produce a dense DDR type zeolite membrane in which 1-adamantaneamine is dissolved easily and completely and which has a uniform crystal size and a desired membrane thickness.

The silica sol solution can be prepared by dissolving a fine powder silica in water, or by hydrolyzing an alkoxide. The silica sol solution can be prepared by adjusting the silica concentration of a commercial silica sol product.

As a modification of the raw material solution, there can be mentioned, for example, a raw material solution containing a very small amount of sodium aluminate used as an additive. By allowing the raw material solution to contain sodium aluminate, part of the Si constituting the DDR type zeolite membrane can be replaced with Al. By using the same means as the replacement of the Si with Al, it is possible to allow the DDR type zeolite membrane to have, for example, a catalytic action of the component introduced by the replacement, in addition to the separation function possessed inherently.

1-2-1-2. Porous Substrate:

There is no particular restriction as to the shape of the porous substrate used in the present production method, and the shape may be any desired shape depending upon the application of the DDR type zeolite membrane produced. Preferred examples of the shape are plate shape, cylindrical shape, honeycomb shape and monolithic shape. Of these, monolithic shape is preferred particularly because, with it, the membrane area per unit volume can be made large and the sealed portion area per membrane area can be made small.

Incidentally, the "monolithic shape" mentioned herein means a columnar shape in which a plurality of through-holes are formed in the central axis direction, and refers to, for example, a columnar shape whose section intersecting with the central axis at right angles is like the section of lotus root. Below is explained, with reference to FIG. 1, an embodiment of the porous substrate, having a monolithic shape, i.e. a so-called monolithic shape porous substrate. Incidentally, the shape of porous substrate and the production method of porous substrate are not restricted thereto, and methods ordinarily used by those skilled in the art can be employed.

FIG. 1 is a perspective view schematically showing a porous substrate 11 used in the present production method. The porous substrate 11 is a cylindrically shaped monolithic porous substrate in which a plurality of through-holes 12 are formed in the central axis direction.

The average porosity of the porous substrate 11 is preferably 10 to 60%, more preferably 20 to 40%. When the porosity is lower than 10%, the pressure loss during separation of to-be-treated fluid may be large; when the porosity is higher than 60%, the strength of the porous substrate 11 may be small. Incidentally, the average porosity is a value measured with a mercury porosimeter.

The porous substrate 11 comprises a plurality of particle layers, and the average pore diameter of the outermost surface layer facing each through-hole 12 is preferably 0.003 to 10 μm, more preferably 0.01 to 1 μm. When the average pore diameter of the outermost surface layer is smaller than 0.003 μm, the pressure loss during separation of to-be-treated fluid may be large; when the average pore diameter is larger than 10 μm, defects may be easily generated in the DDR type zeolite membrane formed on the porous substrate.

The length of the porous substrate 11 and the area of the substrate section intersecting with the substrate central axis at right angles can be determined appropriately depending upon the application of the DDR type zeolite membrane produced, and there can be preferably used a porous substrate having a length of, for example, about 40 to 1,000 mm. The material of the porous substrate 11 is preferably a ceramic (e.g. alumina, zirconia or mullite), a glass, a zeolite, a clay, a metal or a carbon. Of these, alumina is preferred for the high strength and low cost.

The density of the through-holes 12 formed in the porous substrate 11 (the number of through-holes/the area of the section of porous substrate perpendicular to substrate central axis) is preferably 0.01 to 15 holes/cm$^2$. When the density of through-holes 12 is smaller than 0.01 hole/cm$^2$, the separation ability for to-be-treated fluid may be low; when the density of through-holes 12 is larger than 15 holes/cm$^2$, the strength of the porous substrate 11 may be low.

The size of each through-hole 12 is preferably 0.5 to 28 mm$^2$ in terms of the area of through-hole section intersecting the substrate central axis at right angles. When the size of each through-hole 12 is smaller than 0.5 mm$^2$, the pressure loss during separation of to-be-treated fluid may be large; when the size of each through-hole 12 is larger than 28 mm$^2$, the strength of the porous substrate 11 may be low or the separation ability for to-be-treated fluid may be low.

1-2-1-3. Seed Crystal of DDR Type Zeolite:

In the membrane formation step of the present production method, crystal growth is allowed to take place from the DDR type zeolite seed crystal adhered on the porous substrate, whereby a DDR type zeolite membrane is formed. Explanation is made below on the method up to adhesion of DDR type zeolite seed crystal on porous substrate.

As the DDR type zeolite seed crystal, there is preferably used one obtained by producing a DDR type zeolite powder according to the method for production of DDR type zeolite, described in "M. J. den Exter, J. C. Jansen, H. van Bekkum, Studies in Surface Science and Catalysis vol. 84, Ed. By J. Weitkamp et al., Elsevier (1994) 1159-1166" and grinding the zeolite powder to obtain a fine powder. The seed crystal after grinding is preferably subjected to sifting using a sieve or the like, so as to have an intended particle diameter range.

In the membrane formation step of the present production method, there is no particular restriction as to the method for adhesion of DDR type zeolite seed crystal on porous substrate, and a method ordinarily used by those skilled in the art can be employed. For example, a dispersion of DDR type zeolite seed crystal in water is prepared, and the dispersion is coated on the portion of porous substrate on which a DDR type zeolite membrane is to be formed, by a coating method selected from dropping method, dip coating method, filtration coating method, flow coating method, spin coating method, printing method, etc. so as to meet the application of the DDR type zeolite membrane produced. When there is produced a DDR type zeolite membrane to be used as a molecular sieve membrane for low-molecular weight gases, there can be mentioned, as an embodiment thereof, formation of a DDR type zeolite membrane on the inner wall surface 15 of each through-hole 12 of a monolithic shape porous substrate 11 shown in the perspective view of FIG. 1. In this embodiment, for example, the side 13 of porous substrate 11 is masked and dip coating is carried out, whereby is obtained a monolithic shape porous substrate 11 having a DDR type zeolite seed crystal adhered on the inner wall surface 15 of each through-hole 12.

1-2-1-4. Hydrothermal Synthesis:

In the membrane formation step of the present production method, a porous substrate having a DDR type zeolite seed crystal adhered thereon is immersed in a raw material solution and a hydrothermal synthesis of DDR type zeolite is allowed to take place. Herewith a precursor of a DDR type zeolite membrane, in which a DDR type zeolite membrane containing 1-adamantaneamine used as a structure-regulating agent is obtained on a porous substrate (hereinafter, the precursor is referred to as "precursor of DDR type zeolite membrane").

When the porous substrate is immersed in the raw material solution and a hydrothermal synthesis is conducted, the temperature of the raw material solution is preferably 90 to 200° C., more preferably 100 to 150° C. When the hydrothermal synthesis is conducted at a temperature of raw material solution, of lower than 90° C., formation of DDR type zeolite membrane may be difficult; when the hydrothermal synthesis is conducted at a temperature of raw material solution, of higher than 200° C., a crystal phase different from DDR type zeolite may be easily formed.

The treating time in the hydrothermal synthesis is preferably 1 to 240 hours, more preferably 1 to 120 hours.

When a DDR type zeolite membrane is formed on the inner wall surface 15 of each through-hole 12 of the monolithic shape porous substrate 11 shown in the perspective view of FIG. 1, the thickness of the DDR type zeolite membrane containing 1-adamantaneamine, formed by hydrothermal synthesis is preferably 0.05 to 15 μm, more preferably 0.1 to 5 μm, particularly preferably 0.1 to 2 μm. When the membrane thickness is larger than 15 μm, the permeance of gas may be small. When the membrane thickness is smaller than 0.05 μm, the strength of the DDR type zeolite membrane may be low.

The porous substrate 11 has many open pores on the surface; therefore, when a membrane is formed on the porous substrate 11, the membrane not only covers the substrate surface but also may infiltrate into the pores of the porous substrate 11. In the present embodiment, "membrane thickness" refers to a thickness including the membrane portion infiltrating into the pores of porous substrate. The thickness of the DDR type zeolite membrane is an average of the membrane thicknesses measured with an electron micrograph at five positions of the membrane section obtained by cutting the membrane in the thickness direction.

1-2-2. Burning Step:

The burning step of the present production method is a step of, after the membrane formation step, heating the precursor of DDR type zeolite membrane at 400° C. or above and at 550° C. or below to burn and remove the 1-adamantaneamine contained in the DDR type zeolite membrane.

The rate at which the 1-adamantaneamine is burnt and removed, differs depending upon the predetermined heating temperature used. In the burning step of the present production method, when the precursor of DDR type zeolite membrane is heated at a predetermined temperature of 400° C. or above and below 450° C., the heating is preferably conducted at a temperature of the above range for 100 hours or longer; when the precursor is heated at a predetermined temperature of 450° C. or above and 550° C. or below, the heating is preferably conducted at a temperature of the above range for 50 hours or longer.

By such a burning step, the 1-adamantaneamine taken into the DDR type zeolite as a structure-directing agent during the hydrothermal synthesis is removed from the DDR type zeolite to complete zeolite formation, and a DDR type zeolite membrane capable of exhibiting sufficient separation ability can be obtained.

The conditions of the heating temperature and heating time used in the burning step are explained below, based on the results of the experiment conducted by the present inventors. The graph shown in FIG. 2 indicates a relation between the heating time and the mass increase-decrease rate of DDR type zeolite powder, at a predetermined heating temperature of 400° C., 500° C. or 600° C., both measured by thermogravimetry-differential thermal analysis (TG-DTA). Incidentally, the mass increase-decrease rate of the vertical axis of the FIG. 2 graph indicates a ratio in which the mass of a DDR type zeolite powder reduces from 0 (zero) time during the measurement. That is, when the value of the mass increase-decrease rate is minus, it means that the mass of the DDR type zeolite powder has reduced from the mass of 0 (zero) time, and the absolute value thereof indicates the mass increase-decrease rate of the DDR type zeolite powder. For example, when the mass increase-decrease rate of the FIG. 2 vertical axis is −2%, the mass decrease rate is 2%. Incidentally, the DDR type zeolite powder used in this heating test is a DDR type zeolite powder of one production lot, having an average particle diameter of 0.8 μm, which was obtained by hydrothermal synthesis using 1-adamantaneamine as a structure-directing agent. As to the temperature elevation rate up to the predetermined heating temperature, it was 10° C./min up to "the predetermined heating temperature −50° C." and 1° C./min from "the predetermined heating temperature −50° C." to "the predetermined heating temperature"; and the time 0 (zero) of FIG. 2 was the start of temperature elevation. In this experiment system, the mass increase-decrease rate of DDR type zeolite powder from the complete burning and removal of 1-adamantanamine contained in DDR type zeolite powder is 11.2% theoretically and was 11.9% as the measured value.

Figure 2:
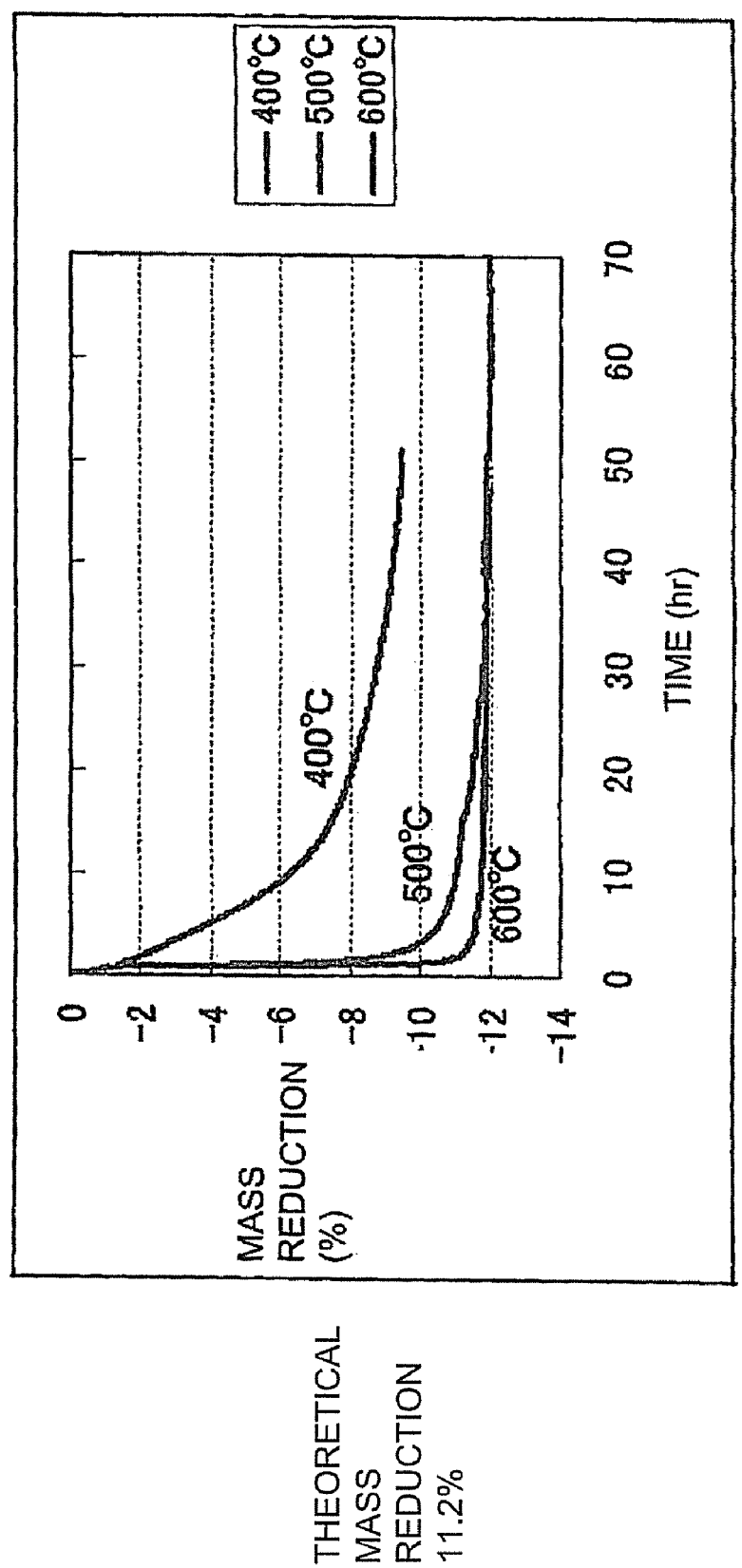
FIG. 2 is a graph showing a relation between the heating time and the mass reduction, of DDR type zeolite powder when a DDR type zeolite powder containing 1-adamantaneamine used as a structure-directing agent has been heated at a predetermined temperature of 400° C., 500° C. or 600° C.

As appreciated from the change of the mass decrease rate of DDR type zeolite powder, indicated in the FIG. 2 graph, the mass of DDR type zeolite powder reduces more rapidly at higher temperatures, and the mass is maintained when the mass reduction reaches 11.9%. In the present experiment, the time in which the DDR type zeolite powder reaches 11.9%, is 18 hours in the case of predetermined heating temperature of 600° C. and 34 hours in the case of predetermined heating temperature of 500° C.

Therefore, it is appreciated from the FIG. 2 graph that, when a DDR type zeolite powder containing 1-adamantaneamine used as a structure-directing agent during the synthesis is heated at predetermined heating temperature of 500° C. or above and at 600° C. or below, the 1-adamantaneamine is burnt and removed from the DDR type zeolite powder almost completely by heating of at least 50 hours.

Meanwhile, when the predetermined heating temperature is set at 400° C., the mass decrease rate of DDR type zeolite powder after 50 hours heating is 9.5%; even after heating of 100 hours or longer, the mass decrease rate is 9.91% and does not reach 11.9%, indicating slight remaining of 1-adamantaneamine.

1-3. Examined Item of the Present Method for Production of DDR Type Zeolite Membrane:

1-3-1. Separation Coefficient:

With the present production method, there can be obtained, at a high yield, a DDR type zeolite membrane having a separation ability of 10 or higher separation coefficient α to a mixed gas of carbon dioxide ($CO_2$) and methane ($CH_4$) (hereinafter, the mixed gas is referred to as "$CO_2/CH_4$ mixed gas") (for details, see Examples given later).

The "separation coefficient α to $CO_2/CH_4$ mixed gas" is obtained by feeding a $CO_2/CH_4$ mixed gas to a DDR type zeolite membrane to allow the $CO_2$ to permeate through the DDR type zeolite membrane and then calculating (($CO_2$ concentration at the gas permeation side/$CH_4$ concentration at the gas permeation side)/($CO_2$ concentration at the gas-feeding side/$CH_4$ concentration at the gas-feeding side)) based on the gas concentration between gas feeding side and gas permeation side across a zeolite membrane.

1-3-2. Permeance of Carbon Dioxide:

In the burning step of the present production method, particularly when the precursor of DDR type zeolite membrane is heated at 450° C. or above and at 550° C. or below for 50 hours or longer, there can be obtained, at a high yield, a DDR type zeolite membrane having a separation ability of 10 or higher separation coefficient α and $200\times10^{-9}$ mol/sec·m²·Pa or higher permeance of carbon dioxide ($CO_2$) (hereinafter, the permeance of carbon dioxide is referred to as "$CO_2$ permeance") (for details, see Examples given later).

The "$CO_2$ permeance (mol/sec·m²·Pa)" is obtained by calculating (the $CO_2$ amount permeated through DDR type zeolite membrane in test hour)/{test hour×unit membrane area×($CO_2$ partial pressure at gas-feeding side−$CO_2$ partial pressure at after-permeation side)}. Incidentally, the "unit membrane area" is calculated from the area of membrane contributing to separation.

EXAMPLES

The present invention is described in more detail below by way of Examples. However, the present invention is in no way restricted to these Examples.

2. Production and Evaluation of DDR Type Zeolite Membranes:

2-1. Production of DDR Type Zeolite Membranes:

After adhesion of the seed crystal on the surface of porous substrate by filtration coating method (Examples 1 to 6 and Comparative Examples 1 and 2) and flow coating method (Example 7 and Comparative Examples 3) in membrane formation step, hydrothermal synthesis was conducted. Then the burning step was conducted to produce DDR type zeolite membranes. Numbers of DDR type zeolite membrane produced were 3 in the case of Example 1, 14 in case of Example 3, 10 in case of Comparative Example 1 and one in case of Examples 2, 4 to 7 and Comparative Examples 2 and 3. And Examples and Comparative Examples in which plurality of DDR type zeolite membranes were produced, were also checked for reproducibility of separation coefficient α and $CO_2$ permeance.

Examples 1 to 6

DDR type zeolite membranes of Examples 1 to 6 were produced by using a filtration coating method which is a production method to adhere seed crystal on the surface of porous substrate.
(1) Membrane Formation Step:
(Preparation of Raw Material Solution):
In a fluoroplastic-made bottle 7.329 g of ethylenediamine (a product of Wako Pure Chemical Industries, ltd.) was placed. Then 1.153 g of 1-adamantaneamine (a product of Sigma-Aldrich Japan KK) was added thereto and dissolved so that there remained no precipitate of 1-adamantaneamine. Next 115.97 g of water was placed in a separate bottle and 97.55 g of a 30 mass % silica sol (Snowtex S, a product of Nissan Chemical Industries, Ltd.) was added, followed by gentle stirring. Thereto was added the above-prepared solution of ethylenediamine and 1-adamantaneamine, and stirring and mixing was conducted for about 1 hour until the mixture became a complete solution, to obtain a raw material solution.
(Porous Substrate):
A monolithic shape porous substrate was used as a porous substrate on which a DDR type zeolite membrane was to be formed. Specifically, there was used an alumina-made monolithic shape porous substrate of 30 mm in diameter and 160 mm in length, having a lotus root shape, which had 37 through-holes of 3 mm in diameter (the outermost surface layer facing each through-hole had open pores of 0.1 µm in average diameter).
(Preparation of DDR Type Zeolite Seed Crystal and Adhesion of Seed Crystal on Surface of Porous Substrate):
A DDR type zeolite powder was produced according to the method for production of DDR type zeolite, described in "M. J. den Exter, J. C. Jansen, H. van Bekkum, Studies in Surface Science and Catalysis vol. 84, Ed. By J. Weitkamp et al., Elsevier (1994) 1159-1166". The powder was ground into a fine powder and used as a DDR type zeolite seed crystal. The DDR type zeolite seed crystal was dispersed in water and the coarse particles were removed to obtain a seed crystal dispersion. The seed crystal dispersion was coated on the inner wall surface of each through-hole of the above-mentioned monolithic shape porous substrate by filtration coating to adhere the DDR type zeolite seed crystal on the inner wall surface of each through-hole of the monolithic shape porous substrate. Incidentally, the monolithic shape porous substrate had no seal (e.g. glass) at the ends.
(Hydrothermal Synthesis):
The raw material solution was placed in a stainless steel-made pressure vessel with a fluoroplastic-made inner cylinder and the monolithic shape porous substrate having a DDR type zeolite seed crystal adhered thereon was immersed in the raw material solution to conduct hydrothermal synthesis. The hydrothermal synthesis was conducted at 120° C. for 84 hours to obtain a precursor of DDR type zeolite membrane, in which a 1-adamantaneamine-containing DDR type zeolite membrane was formed. After the hydrothermal synthesis, the precursor was water-washed and dried. It was confirmed that, in the precursor, the 1-adamantaneamine-containing DDR type zeolite membrane was formed, in a thickness of 1 to 2 µm, on the inner wall surface of each through-hole of the monolithic shape porous substrate. Incidentally, the step up to this stage was conducted in the same manner for all of Examples 1 to 6.

Example 7

DDR type zeolite membranes of Examples 7 was produced by using a flow coating method which is a production method to adhere seed crystal on the surface of porous substrate.
(1) Membrane Formation Step:
(Preparation of Raw Material Solution):
In a fluoroplastic-made bottle, 7.35 g of ethylenediamine (a product of Wako Pure Chemical Industries, ltd.) was placed. Then 1.156 g of 1-adamantaneamine (a product of Sigma-Aldrich Japan KK) was added thereto and dissolved so that there remained no precipitate of 1-adamantaneamine. Next 116.55 g of water was placed in a separate bottle and 98.0 g of a 30 mass % silica sol (Snowtex S, a product of Nissan Chemical Industries, Ltd.) was added, followed by gentle stirring. Thereto was added the above-prepared solution of ethylenediamine and 1-adamantaneamine, and stirring and mixing was conducted for about 1 hour until the mixture became a complete solution, to obtain a raw material solution.
(Porous Substrate):
A monolithic shape porous substrate was used as a porous substrate on which a DDR type zeolite membrane was to be formed. Specifically, an alumina monolithic shape porous substrate of 30 mm in diameter and 160 mm in length, having a lotus root shape, which had 55 through-holes of 2.5 mm in diameter (the outermost surface layer facing each through-hole had open pores of 0.1 µm in average diameter) was used. Incidentally, the monolithic shape porous substrate had a glass seal at the ends.
(Preparation of DDR type Zeolite Seed Crystal):
Preparations of DDR type zeolite seed crystal and dispersion of seed crystals were conducted in the same manner as in above Examples 1 to 6.
(Adhesion of Seed Crystal on Surface of Porous Substrate):
Next the dispersion of seed crystals was diluted with ion exchanged water by mixing with stirrer at 300 rpm to prepare the slurry for adhesion of DDR type zeolite seed crystal having its concentration of 0.006 mass %. The monolithic shape porous substrate whose through-holes were extended vertically was placed under the bottom of wide-mouth funnel. The slurry for adhesion was passed through the through-holes by way of flowing 160 ml slurry for adhesion from top of the monolithic shape porous substrate. Then the monolithic shape porous substrate in which the slurry was passed through was air dried by flowing air into the through-holes at speed of 3 to 6 m/s for 60 minutes. The above slurry flowing coating and following air drying was made two times to obtain the monolithic shape porous substrate where DDR type zeolite seed crystal was adhered.
(Hydrothermal Synthesis):
The raw material solution was placed in a stainless steel-made pressure vessel with a fluoroplastic-made inner cylinder and the monolithic shape porous substrate having a DDR type zeolite seed crystal adhered thereon was immersed in the raw material solution to conduct hydrothermal synthesis. The hydrothermal synthesis was conducted at 150° C. for 16 hours to obtain a precursor of DDR type zeolite membrane, in which a 1-adamantaneamine-containing DDR type zeolite membrane was formed. After the hydrothermal synthesis, the precursor was water-washed and dried.

(2) Burning Step:

The precursor of DDR type zeolite membrane was heated in the air at the heating temperature and heating time, shown in Table 1, to burn and remove the 1-adamantaneamine contained in the DDR type zeolite membrane of the precursor of DDR type zeolite membrane. The heating in the burning step is explained in detail. Temperature elevation was made at a rate of 0.1° C./min; from the time at which the heating temperature shown in Table 1 had been reached, the heating temperature was maintained for the heating time shown in Table 1; after the predetermined heating time had passed, the temperature was lowered at a rate of 0.5° C./min to obtain each of DDR type zeolite membranes of Examples 1 to 6.

TABLE 1

|  | Heating temperature (° C.) | Heating time (hr) | Number of samples |
|---|---|---|---|
| Example 1 | 550 | 50 | 3 |
| Example 2 | 525 | 50 | 1 |
| Example 3 | 500 | 50 | 14 |
| Example 4 | 450 | 50 | 1 |
| Example 5 | 430 | 100 | 1 |
| Example 6 | 400 | 100 | 1 |
| Example 7 | 450 | 50 | 1 |
| Comparative Example 1 | 600 | 10 | 10 |
| Comparative Example 2 | 575 | 50 | 1 |
| Comparative Example 3 | 600 | 10 | 1 |

Comparative Examples 1 and 2

DDR type zeolite membranes of Comparative Examples 1 and 2 were obtained in the same manner as in Example 1 except that the heating temperature and the heating time were set as shown in Table 1.

Comparative Example 3

DDR type zeolite membrane of Comparative Example 3 was obtained in the same manner as in Example 7 except that the heating temperature and the heating time were set as shown in Table 1.

2-2. Evaluation of DDR Type Zeolite Membranes:

The DDR type zeolite membranes of Examples 1 to 7 and Comparative Examples 1 to 3 were subjected to the following tests, for evaluation thereof.

2-2-1. X-Ray Diffraction:

X-ray diffraction was conducted for each of the DDR type zeolite membranes of Examples 1 to 7 and Comparative Examples 1 to 3. As a result, only the diffraction peak of the DDR type zeolite and the alumina constituting the porous substrate was detected (the data is not shown). Incidentally, the "diffraction peak of DDR type zeolite" is a diffraction peak described in No. 38-651 or 41-571 corresponding to Deca-dodecasil 3R shown in International Center for Diffraction Data (ICDD) "Powder Diffraction File".

2-2-2. Measurement of Separation Coefficient α to $CO_2/CH_4$ Mixed Gas:

The following gas permeation test was conducted in order to calculate the separation coefficient α to $CO_2/CH_4$ mixed gas, of each of the DDR type zeolite membranes of Examples 1 to 7 and Comparative Examples 1 to 3. A $CO_2/CH_4$ mixed gas ($CO_2:CH_4=1:1$ by volume) was introduced into the through-holes of the DDR type zeolite membrane at a rate of 10 liters/min at 25° C. at 0.6 MPa (absolute pressure). Incidentally, a mass flow controller (a product of HEMMI Slide Rule Co. Ltd.) was used to control the introduction rate of the $CO_2/CH_4$ mixed gas. Also, in introduction of the $CO_2/CH_4$ mixed gas into the through-holes, the pressure at the after-permeation side of the DDR type zeolite membrane was controlled so as to become the same as the atmospheric pressure. The flow rate of the after-permeation gas was measured by a mass flow meter (a product of HORIBA Ltd.) and, when the flow rate of the after-permeation gas become steady sufficiently, the compositional ratio of $CO_2$ and $CH_4$ in after-permeation gas was measured by GC-MS (a product of Hewlett-Packard Company).

In order to measure the separation coefficient α to $CO_2/CH_4$ mixed gas, there were measured a $CO_2$ concentration at after-permeation side, a $CH_4$ concentration at after-permeation side, a $CO_2$ concentration at gas-feeding side, and a $CH_4$ concentration at gas-feeding side. Each separation coefficient α to $CO_2/CH_4$ mixed gas, calculated from the measurement result is shown in Table 2. Also, in Table 3 is shown a proportion in which "DDR type zeolite membrane having a separation coefficient α to $CO_2/CH_4$ mixed gas, of 10 or higher" was obtained in each of Examples 1 to 7 and Comparative Examples 1 to 3.

TABLE 2

|  | Sample No. | Heating temp. (° C.) | Heating time (hr) | Separation coefficient α | $CO_2$ permeance ($\times 10^{-9}$ mol/sec·m²·Pa) |
|---|---|---|---|---|---|
| Example 1 | 1 | 550 | 50 | 1 | 210 |
|  | 2 |  |  | 221 | 272 |
|  | 3 |  |  | 13 | 263 |
| Example 2 | 4 | 525 | 50 | 202 | 256 |
| Example 3 | 5 | 500 | 50 | 153 | 305 |
|  | 6 |  |  | 205 | 289 |
|  | 7 |  |  | 225 | 233 |
|  | 8 |  |  | 197 | 259 |
|  | 9 |  |  | 139 | 233 |
|  | 10 |  |  | 54 | 239 |
|  | 11 |  |  | 52 | 227 |
|  | 12 |  |  | 89 | 256 |
|  | 13 |  |  | 90 | 245 |
|  | 14 |  |  | 195 | 244 |
|  | 15 |  |  | 40 | 249 |
|  | 16 |  |  | 177 | 244 |
|  | 17 |  |  | 30 | 257 |
|  | 18 |  |  | 143 | 256 |
| Example 4 | 19 | 450 | 50 | 24 | 203 |
| Example 5 | 20 | 430 | 100 | 60 | 164 |
| Example 6 | 21 | 400 | 100 | 35 | 40 |
| Example 7 | 22 | 450 | 50 | 13 | 219 |
| Comparative Example 1 | 23 | 600 | 10 | Impossible to measure (*) |  |
|  | 24 |  |  | 145 | 277 |
|  | 25 |  |  | Impossible to measure (*) |  |
|  | 26 |  |  | 2 | 216 |
|  | 27 |  |  | 3 | 205 |
|  | 28 |  |  | 1 | 217 |
|  | 29 |  |  | 2 | 239 |
|  | 30 |  |  | 1 | 209 |
|  | 31 |  |  | 1 | 208 |
|  | 32 |  |  | Impossible to measure (*) |  |
| Comparative Example 2 | 33 | 575 | 50 | 3 | 238 |
| Comparative Example 3 | 34 | 600 | 10 | Impossible to measure (*) |  |

(*): Too high permeance made the measurement impossible.

TABLE 3

|  | Heating temperature (° C.) | Heating time (hr) | Yield*1 |
|---|---|---|---|
| Example 1 | 550 | 50 | 67% (2/3) |
| Example 2 | 525 | 50 | 100% (1/1) |
| Example 3 | 500 | 50 | 100% (14/14) |
| Example 4 | 450 | 50 | 100% (1/1) |
| Example 5 | 430 | 100 | 100% (1/1) |
| Example 6 | 400 | 100 | 100% (1/1) |
| Example 7 | 450 | 50 | 100% (1/1) |
| Comparative Example 1 | 600 | 10 | 10 (%) (1/10) |
| Comparative Example 2 | 575 | 50 | 0% (0/1) |
| Comparative Example 3 | 600 | 10 | 0% (0/1) |

*1The proportion of samples which gave a separation coefficient of 10 or higher.

In sample number 1 to 22 listed in Examples 1 to 7 shown in Table 2, 21 samples out of the total 22 samples used showed a separation coefficient α of 10 or higher to the $CO_2/CH_4$ mixed gas used. Particularly in Example 3 in which the heating temperature was 500° C. and the heating time was 50 hours in the burning step, 8 samples out of the total 14 samples used showed a separation coefficient α of 100 or higher. In contrast, in sample number 23 to 34 listed in Comparative Examples 1 to 3 shown in Table 2, only 1 sample out of the 8 samples (for which measurement was possible) showed a separation coefficient α of 10 or higher to the $CO_2/CH_4$ mixed gas used.

Figure 3:
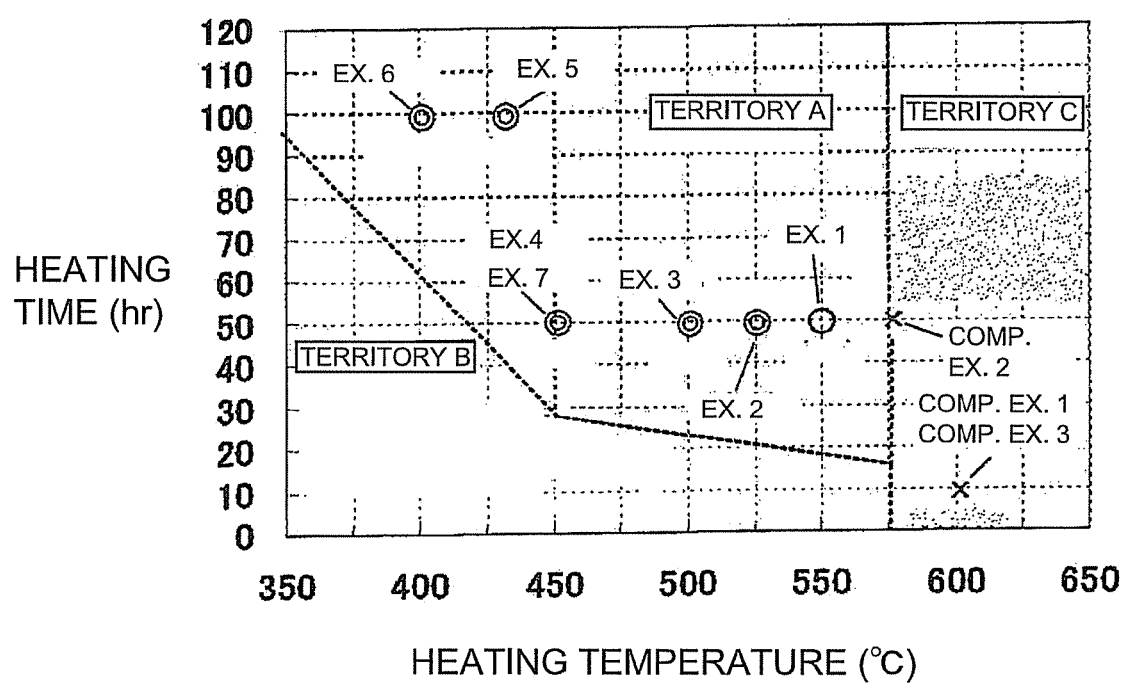
FIG. 3 shows a relation between the heating temperature and the heating time both used in burning step when, in Examples 1 to 7 and Comparative Examples 1 and 3, DDR type zeolite membranes each having a separation coefficient α of 10 or higher to a $CO_2/CH_4$ mixed gas have been obtained at respective proportions.

Based on these results, there is shown, in FIG. 3, a relation between the heating temperature and the heating time both in the burning step, when DDR type zeolite membranes each having a separation coefficient α of 10 or higher to the $CO_2/CH_4$ mixed gas used were obtained in Examples 1 to 6 and Comparative Examples 1 and 2, at respective proportions (hereinafter in this paragraph, this proportion is referred to as "yield"). Incidentally, in FIG. 3, each symbol shown indicates a yield; ⊚ indicates a yield of 75% to 100%; ○ indicates a yield of 50% to less than 75%; Δ indicates a yield of 25% to less than 50%; and X indicates a yield of 0% to less than 25%. Also, the area of heating conditions wherein the yield is 50% or higher, is surrounded by a broken line and is indicated as "territory A". Also in FIG. 3, "territory B" is an area of heating conditions wherein the yield is less than 50% and wherein the burning and removal of 1-adamantaneamine used as a structure-directing agent is insufficient and, therefore, DDR type zeolite membranes showing an insufficient $CO_2$ permeance of DDR type zeolite pores are produced at a high proportion. In FIG. 3, "territory C" is an area of heating conditions wherein the yield is less than 50% and wherein the difference in thermal expansion during heating between DDR type zeolite membrane and porous substrate (composed mainly of alumina) is large and, therefore, cracks are generated in the DDR type zeolite membrane at a high frequency. Incidentally, the territories A to C in FIG. 3 were determined not only based on the above results of Examples 1 to 7 and Comparative Examples 1 to 3 but also based on the experiment (whose data are shown in FIG. 2 of the present specification) and other preliminary experiments (whose data are not shown in the present specification), all conducted by the present applicant.

2-2-3. Measurement of $CO_2$ Permeance:

Each $CO_2$ permeance (mol/sec·m²·Pa) calculated from the measurement result is shown in Table 2. Also, in Table 4 is shown a proportion at which "DDR type zeolite membrane having a separation coefficient of 10 or higher and a $CO_2$ permeance of $200\times10^{-9}$ mol/sec·m²·Pa or higher" was obtained in each of Examples 1 to 7 and Comparative Examples 1 to 3.

TABLE 4

|  | Heating temperature (° C.) | Heating time (hr) | Yield*1 |
|---|---|---|---|
| Example 1 | 550 | 50 | 67% (2/3) |
| Example 2 | 525 | 50 | 100% (1/1) |
| Example 3 | 500 | 50 | 100% (14/14) |
| Example 4 | 450 | 50 | 100% (1/1) |
| Example 5 | 430 | 100 | 0% (0/1) |
| Example 6 | 400 | 100 | 0% (0/1) |
| Example 7 | 450 | 50 | 100% (1/1) |
| Comparative Example 1 | 600 | 10 | 10% (1/10) |
| Comparative Example 2 | 575 | 50 | 0% (0/1) |
| Comparative Example 3 | 600 | 10 | 0% (0/1) |

*1The proportion of samples which gave a separation coefficient of 10 or higher and a $CO_2$ permeance of $200 \times 10^{-9}$ mol/sec · m² · Pa or higer.

Figure 4:
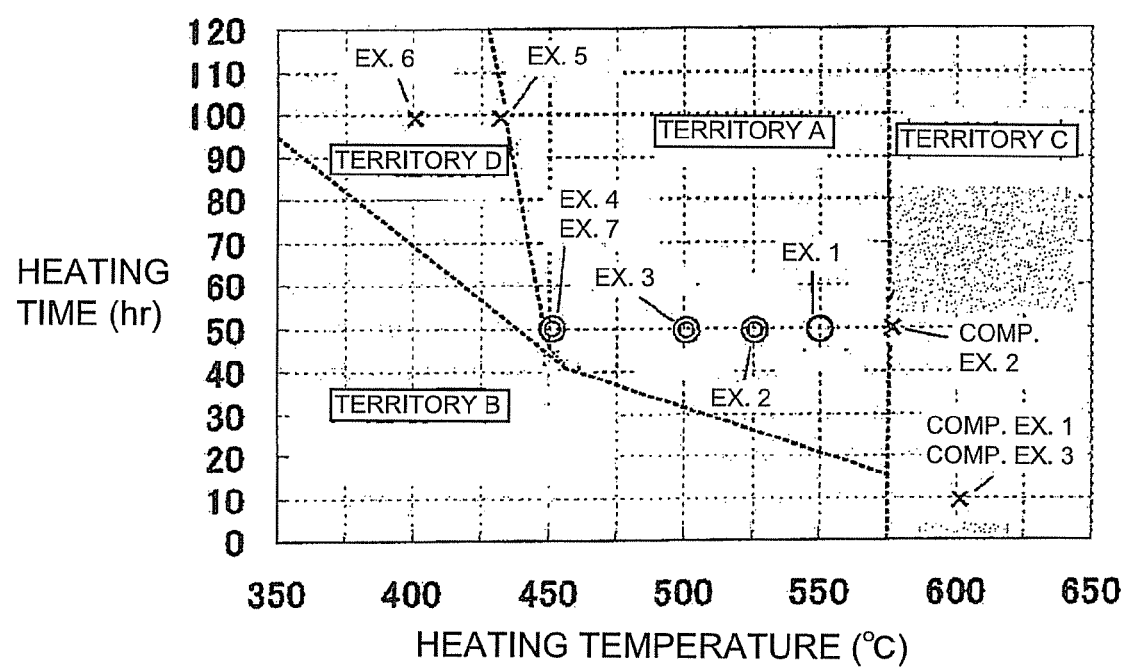
FIG. 4 shows a relation between the heating temperature and the heating time both used in burning step when, in Examples 1 to 7 and Comparative Examples 1 and 3, DDR type zeolite membranes each having a separation coefficient of 10 or higher to the $CO_2/CH_4$ mixed gas and a $CO_2$ permeance of $200 \times 10^{-9}$ mol/sec·m²·Pa or higher have been obtained at respective proportions.

In the total 7 samples of Examples 1 to 4, the $CO_2$ permeance was $200\times10^{-9}$ mol/sec·m²·Pa or higher. Based on these results, there is shown, in FIG. 4, a relation between the heating temperature and the heating time both in the burning step, when DDR type zeolite membranes each having a separation coefficient of 10 or higher and a $CO_2$ permeance of $200\times10^{-9}$ mol/sec·m²·Pa or higher were obtained in Examples 1 to 4, at respective proportions (hereinafter in this paragraph, this proportion is referred to as "yield"). Incidentally, in FIG. 4, each symbol shown indicates a yield; ⊚ indicates a yield of 75% to 100%; ○ indicates a yield of 50% to less than 75%; Δ indicates a yield of 25% to less than 50%; and X indicates a yield of 0% to less than 25%. Also, the area of heating conditions wherein the yield is 50% or higher, is surrounded by a broken line and is indicated as "territory A". Also in FIG. 4, "territory B" and "territory D" are each an area of heating conditions wherein the yield is less than 50% and wherein the burning and removal of 1-adamantaneamine used as a structure-directing agent is insufficient and, therefore, DDR type zeolite membranes showing an insufficient $CO_2$ permeance of DDR type zeolite pores are produced at a high proportion. Incidentally, the "territory D" is an area of heating conditions wherein "DDR type zeolite membrane having a separation coefficient α of 10 or higher to the $CO_2/CH_4$ mixed gas used" is obtained at a proportion of 50% or higher but "DDR type zeolite membrane having a $CO_2$ permeance of $200\times10^{-9}$ mol/sec·m²·Pa or higher" is obtained at a proportion of lower than 50%. In FIG. 4, "territory C" is an area of heating conditions wherein the yield is less than 50% and wherein the difference in thermal expansion during heating between DDR type zeolite membrane and porous substrate (composed mainly of alumina) is large and, therefore, cracks are generated in the DDR type zeolite membrane at a high frequency. Incidentally, the territories A to C in FIG. 4 were determined not only based on the above results of Examples 1 to 7 and Comparative Examples 1 to 3 but also based on the experiment (whose data are shown in FIG. 2 of the present specification) and other preliminary experiments (whose data are not shown in the present specification), all conducted by the present applicant.

2-3. Overall Evaluation:

As described above, it was proven experimentally in Examples 1 to 7 and Comparative Examples 1 to 3 that the present production method enables production of a DDR type zeolite membrane exhibiting a high separation ability of 10 or higher separation coefficient α to $CO_2/CH_4$ mixed gas. It was clear that the present production method enables production of a superior DDR type zeolite membrane exhibiting a separation ability of $200 \times 10^{-9}$ mol/sec·m²·Pa or higher $CO_2$ permeance by heating, in the burning step, a precursor of DDR type zeolite membrane at 450° C. or above and at 550° C. or below for 50 hours or longer.

INDUSTRIAL APPLICABILITY

The present invention can be utilized by a method for producing a DDR type zeolite membrane capable of functioning as a molecular sieve membrane to low-molecular weight gases such as carbon dioxide ($CO_2$), methane ($CH_4$), ethane ($C_2H_6$) and the like.

What is claimed is:

1. A method for producing a DDR type zeolite membrane having a separation ability of 10 or higher separation coefficient to a mixed gas of carbon dioxide ($CO_2$) and methane ($CH_4$), said method comprising:

a membrane formation step of immersing a porous substrate having a DDR type zeolite seed crystal adhered thereon, in a raw material solution containing 1-adamantaneamine, silica ($SiO_2$) and water, and conducting a hydrothermal synthesis of DDR type zeolite to form a 1-adamantaneamine-containing DDR type zeolite membrane on the porous substrate to produce a precursor of DDR type zeolite membrane; and a burning step of heating the precursor at 400° C. or above and at 550° C. or below for 50 hours or longer to burn and remove the 1-adamantaneamine contained in the DDR type zeolite membrane.

2. The method for producing a DDR type zeolite membrane, according to claim 1, wherein, in the burning step, the precursor is heated at 400° C. or above and below 450° C. for 100 hours or longer.

3. The method for producing a DDR type zeolite membrane, according to claim 1, wherein, in the burning step, the precursor is heated at 450° C. or above and at 550° C. or below for 50 hours or longer to obtain a DDR type zeolite membrane having a separation ability of 10 or higher separation coefficient to a mixed gas of carbon dioxide ($CO_2$) and methane ($CH_4$) and $200 \times 10^{-9}$ mol/sec·m²·Pa or higher permeance of carbon dioxide ($CO_2$).

* * * * *